United States Patent
Le Bars

(10) Patent No.: US 7,448,655 B2
(45) Date of Patent: Nov. 11, 2008

(54) INSTANTANEOUS CONNECTION DEVICE

(75) Inventor: Nicolas Le Bars, Thorigne (FR)

(73) Assignee: Legris SA, Rennes (FR)

( * ) Notice: Subject to any disclaimer, the term of this patent is extended or adjusted under 35 U.S.C. 154(b) by 369 days.

(21) Appl. No.: 10/554,283

(22) PCT Filed: May 11, 2004

(86) PCT No.: PCT/FR2004/001141

§ 371 (c)(1),
(2), (4) Date: Oct. 25, 2005

(87) PCT Pub. No.: WO2004/109175

PCT Pub. Date: Dec. 16, 2004

(65) Prior Publication Data

US 2008/0018105 A1    Jan. 24, 2008

(30) Foreign Application Priority Data

May 28, 2003    (FR) .................................. 03 06488

(51) Int. Cl.
*F16L 21/06* (2006.01)
(52) U.S. Cl. ....................... 285/323; 285/307
(58) Field of Classification Search .............. 285/307, 285/322, 323, 232
See application file for complete search history.

(56) References Cited

U.S. PATENT DOCUMENTS

| | | | | |
|---|---|---|---|---|
| 1,153,621 A | * | 9/1915 | Hutchings | 285/322 |
| 3,394,950 A | * | 7/1968 | Jensen | 285/322 |
| 4,083,586 A | * | 4/1978 | Helm | 285/323 |
| 5,112,086 A | * | 5/1992 | Gruber et al. | 285/319 |
| 5,407,236 A | * | 4/1995 | Schwarz et al. | 285/322 |
| 6,056,328 A | | 5/2000 | Kubota | |
| 6,199,920 B1 | * | 3/2001 | Neustadtl | 285/322 |
| 6,349,978 B1 | * | 2/2002 | McFarland et al. | 285/319 |
| 6,964,436 B2 | * | 11/2005 | Le Quere | 285/319 |

FOREIGN PATENT DOCUMENTS

| | | |
|---|---|---|
| CH | 442 899 | 8/1967 |
| EP | 1 308 662 | 5/2003 |
| GB | 2 292 780 | 3/1996 |

\* cited by examiner

*Primary Examiner*—David E Bochna
(74) *Attorney, Agent, or Firm*—Young & Thompson

(57) ABSTRACT

An instantaneous connection device includes a tubular body and a tight element which is used to hold the end of a line in the body and includes a holding element arranged to receive the end of the line and a cam element arranged between the body and the holding element and used to move the holding element from a free state into a state wherein it grips the end of the line when it is axially displaced in the tubular body between a first position and a second position. The holding element includes two jaws independently mounted in the body so as to slide between the two positions, and the cam element includes two transversal pins that are fixed to the jaws or body so as to slidingly co-operate, with transversal surfaces fixed to the body or the jaws and inclined in relation to the sliding direction.

17 Claims, 3 Drawing Sheets

INSTANTANEOUS CONNECTION DEVICE

The present invention relates to an instantaneous coupling device suitable for coupling a pipe end to an element of a fluid transport circuit.

Such an element may be another pipe, or it may be a fluid-emitter element such as a pump, or it may be a fluid-receiver element such as a tank.

BACKGROUND OF THE INVENTION

In general, an instantaneous coupling device comprises a tubular body and means for retaining a pipe end in leaktight manner in the body. Said means comprise a retaining member arranged to receive the pipe end, and cam means interposed between the body and the retaining member to bring the retaining member from a release state in which it releases the pipe end to a grip state in which it grips the pipe end, on the retaining member being moved axially inside the body between a first position and a second position.

A retaining member in common use is constituted by a tube having longitudinal slots formed in one end thereof individualizing claws that are deformable in bending between the release state in which they define an inside diameter greater than or equal to an outside diameter of the pipe end, and a grip state in which they define an inside diameter smaller than the outside diameter of the pipe end.

The cam means are generally constituted by an inside surface of frustoconical shape formed in the wall forming the tubular body and centered on the axis of the tubular body.

Coupling devices constructed in that way are very effective. Nevertheless, the amplitude of deformation of the claws, and thus the difference between the minimum and maximum inside diameters defined thereby, is limited by the thickness of the wall of the tubular body in which the frustoconical surface is defined. The outside diameter of pipes usable with any given coupling device an therefore vary only very little, otherwise it is no longer guaranteed that the retaining member will grip the pipe end firmly.

Furthermore, claw retaining members, also known as clamps, must be made of a material that is sufficiently flexible to enable the claws to deform, while also being sufficiently hard to enable the claws to penetrate into the pipe end. When the pipe end is made of a relatively hard plastics material, the material used for making the clamp is a thermosetting material. Nevertheless, such a material is not recyclable and allows only slow rates of manufacturing throughput. When the material constituting the pipe end is relatively flexible, the clamp is made of flexible thermoplastic material. The use of a flexible thermoplastic material is more advantageous in terms of manufacture and recyclability of the clamp, but is nevertheless limited in terms of the claws having relatively small ability to penetrate into the pipe end. Hard thermoplastic materials are not suitable for use in making such clamps because of the risk of the claws breaking when being deformed between their two states.

OBJECT OF THE INVENTION

An object of the invention is to provide a coupling device presenting good connection capacities, while being simple in structure and relatively inexpensive to manufacture.

BRIEF SUMMARY OF THE INVENTION

To this end, the invention provides an instantaneous coupling device comprising a tubular body and means for retaining a pipe end in leaktight manner in the body, said means comprising a retaining member arranged to receive the pipe end and cam means interposed between the body and the retaining member to bring the retaining member from a release state in which it releases the pipe end to a grip state in which it grips the pipe end when the retaining member is moved axially in the body from a first position to a second position, the retaining member comprising two independent jaws mounted in the body to slide between the two above-mentioned positions, and the cam means comprising two transverse studs secured to the jaws or to the body to co-operate in sliding with transverse surfaces secured to the body or the jaws and that are inclined relative to the sliding direction.

Thus, the amplitude of the displacement of the jaws relative to each other no longer depends on the thickness of the tubular body but on its circumference, which is generally greater than its thickness. Making the retaining member as independent jaws that are moved towards each other or spaced apart from each other does not require the retaining member to be deformed, so it can therefore be made of a hard thermoplastic material. This further increases the reliability of the retaining member.

It is then preferable for each transverse stud to project outwards from one of the jaws and for the transverse surfaces to belong to the body.

Such a structure makes the body easier to make by injection molding a plastics material, because it makes unmolding relatively easy.

Advantageously, the transverse surfaces are defined in a hole formed transversely through the body, and preferably, the hole opens to the outside of the body.

Thus, the cavity gives access to the studs and enables them to be manipulated directly from the outside of the coupling device.

Other characteristics and advantages of the invention appear on reading the following description of a particular and non-limiting embodiment of the invention.

BRIEF DESCRIPTION OF THE DRAWINGS

Reference is made to the accompanying drawings, in which.

DETAILED DESCRIPTION OF THE INVENTION

Figure 1:
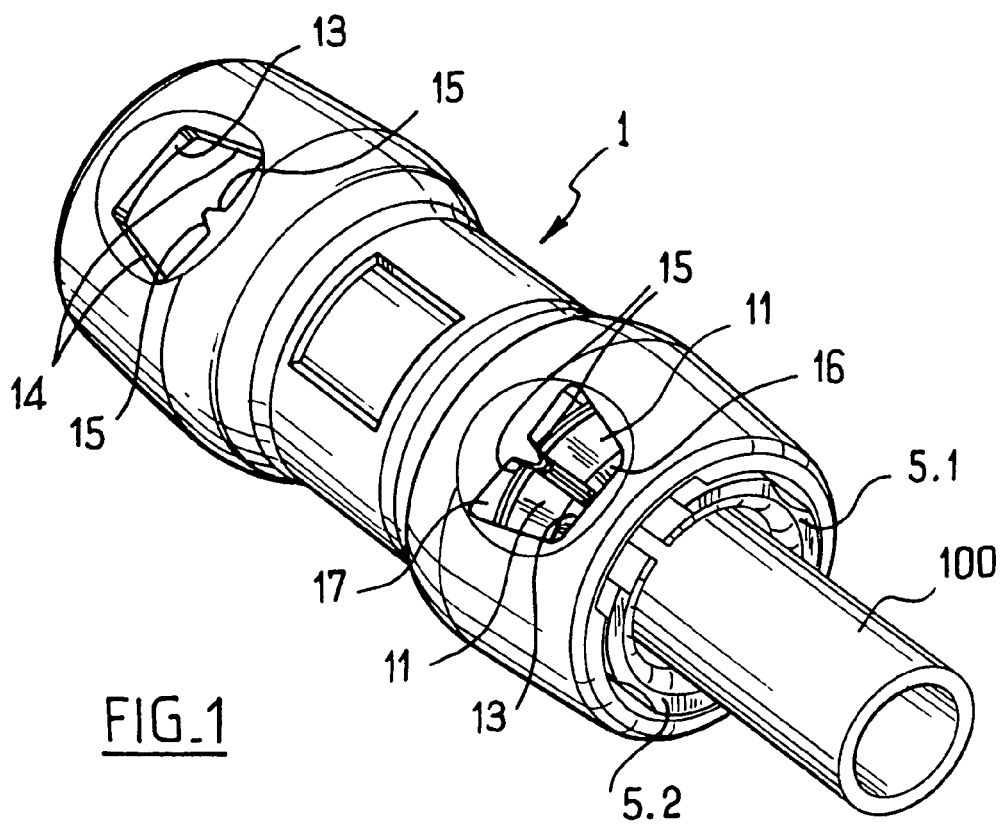
FIG. 1 is a perspective view of a coupling device in accordance with the invention.

The coupling device of the invention is constituted in this example by a coupling for connecting together two pipe ends 100 (only one of which is visible in FIG. 1). The invention is equally applicable to connecting a pipe end to an element in a fluid transport circuit, which element may be a fluid emitter such as a pump, or a fluid receiver such as a tank.

The coupling comprises a body given overall reference 1 that is tubular in shape, defining a stepped channel having a central segment 2 and end segments 3, each receiving retaining means for retaining in leaktight manner a pipe end 100 in the body 1. This body is symmetrical and the leaktight retaining means housed in each of the ends of the body are identical.

In a variant, one of its ends could be provided with leaktight retaining means different from those described below. When connecting a pipe end to an element of a fluid transport circuit, the coupling can have one end made integrally with the circuit element or that is mounted on the circuit element in known manner by snap-fastening, force-fitting, or by using any other releasable or permanent fastener means.

The leaktight retaining means comprise a sealing element 4 and a retaining member 5 which are arranged to receive the pipe end.

This sealing element 4 is constituted by an elastomer O-ring having an inside diameter that is slightly smaller than an outside diameter of the pipe end 100. The sealing element 4 is adjacent to a shoulder 6 extending between the end segment 3 and the central segment 2. The shoulder 6 is defined by a convex frustoconical surface having setbacks 7 formed axially therein.

Figure 2:
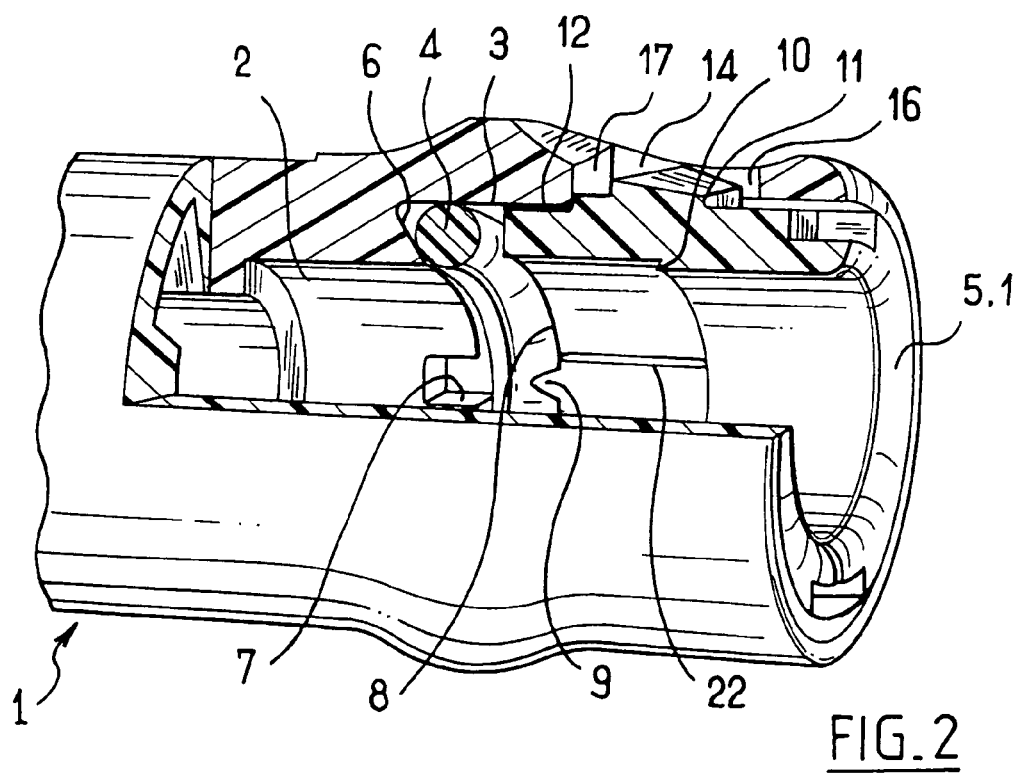
FIG. 2 is a partially cutaway fragmentary perspective view of the device.
Figure 3:
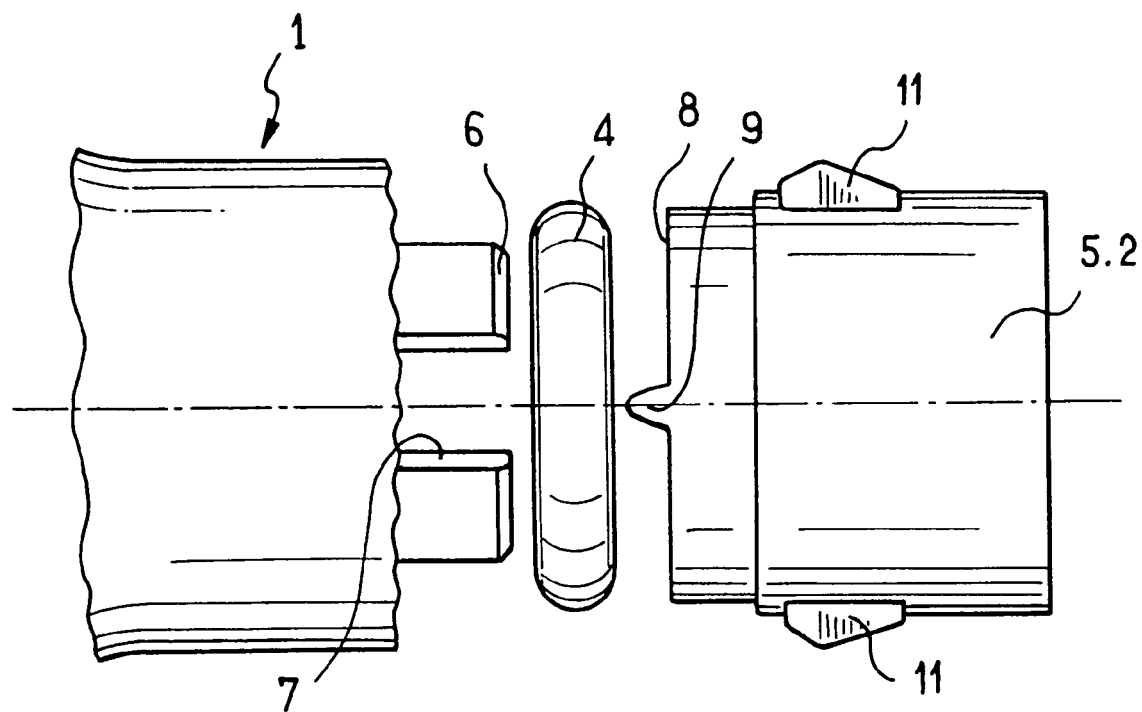
FIG. 3 is a partially cutaway exploded fragmentary view of the device.
Figure 4:
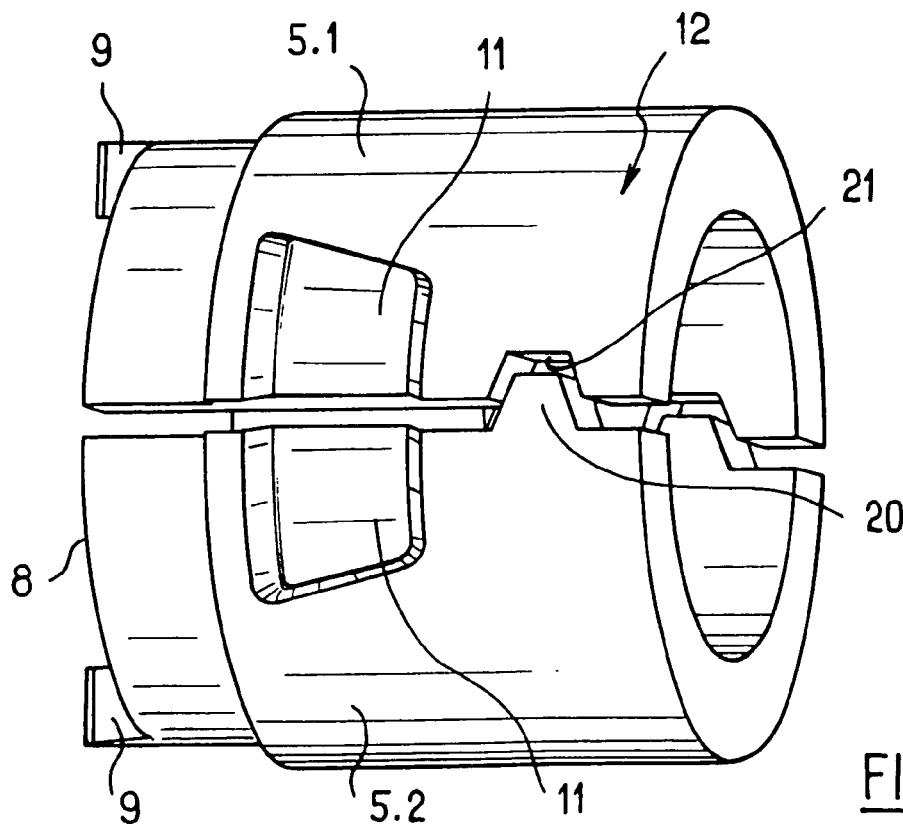
FIG. 4 is a perspective view of the retaining member.

The retaining member 5 is tubular in shape and comprises two jaws 5.1 and 5.2. Each jaw 5.1, 5.2 has a flared inlet section to facilitate inserting the pipe end 100 into the retaining member 5, and at its opposite end a radial terminal face 8 with tongues 9 extending axially therefrom in register with the setbacks 7. The tongues 9 and the setbacks 7 in this example are disposed symmetrically relative to the jaws and to the shoulder. The jaws 5.1 and 5.2 are mounted in the end segment 3 to slide parallel to the insertion direction of the pipe end 100 between first and second successive positions in the direction opposite to the insertion direction of the pipe end 100. When the retaining member 5 is in the first position, the sealing element 4 is flattened and stretched between the shoulder 6 and the tongues 9, with the tongues 9 and the setbacks 7 defining chicanes in which the sealing element 4 extends. The number of chicanes could be different. The sealing element is also expanded radially because of the slope of the convex frustoconical surface forming the shoulder 6. When the retaining element 5 is in the second position (FIG. 2), the sealing element 4 is in a state of smaller deformation, so that it tends to urge the retaining member 5 resiliently towards this position.

Figure 5:
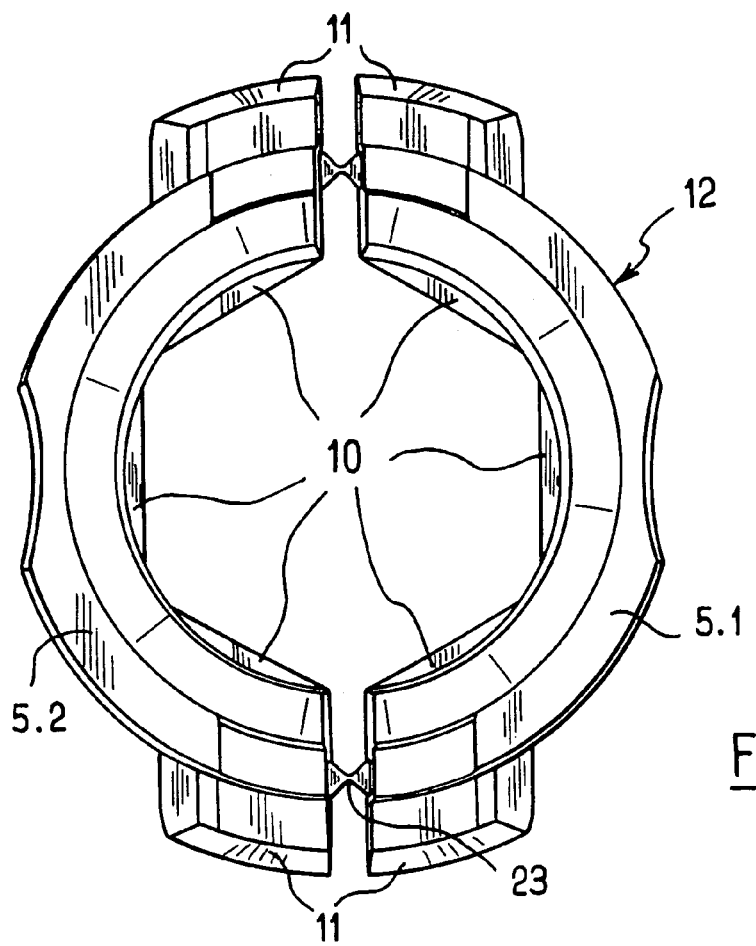
FIG. 5 is an end view thereof.
Figure 6:
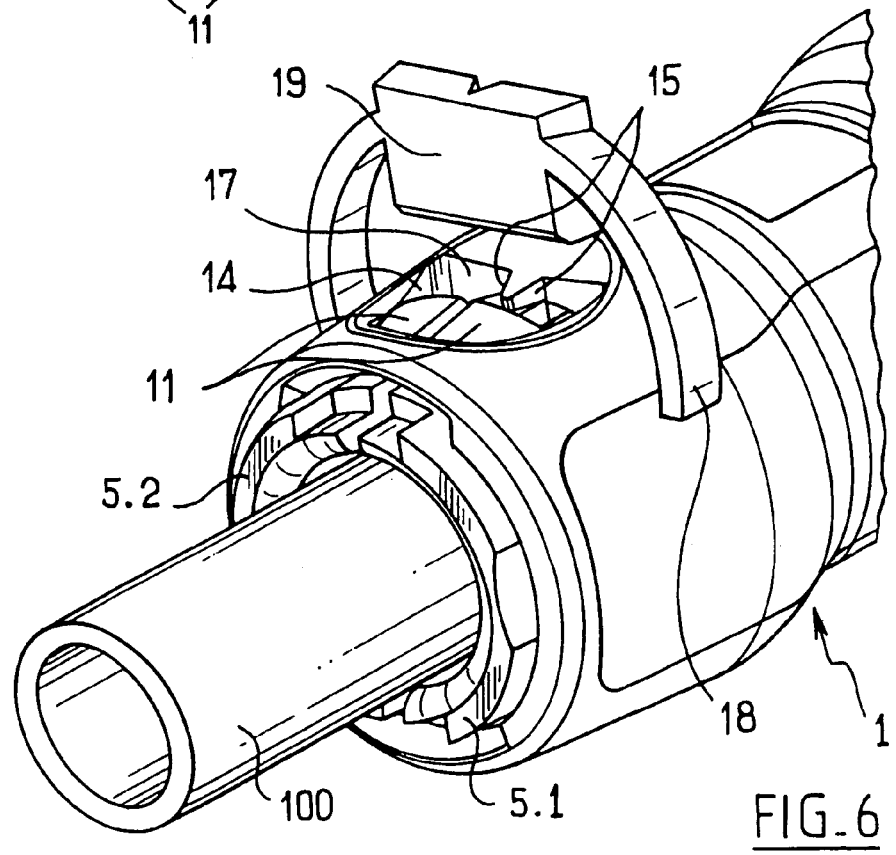
FIG. 6 is a fragmentary perspective view of the device.

Each jaw 5.1, 5.2 has an inside surface provided with teeth 10. The teeth 10 are in the form of rectilinear connection sectors (see FIG. 5) but the could equally well be convex or concave. When concave, the sector is constituted by a circular arc of radius greater than the outside radius of the pipe end (otherwise the sector comes into contact with the pipe via two points forming stress concentration zones that tend to be crushed).

Two studs 11 extend transversely projecting from the outside surface 12 of the jaw 5.1, 5.2 in the vicinity of the longitudinal edges of the jaws 5.1, 5.2.

Each pair of adjacent studs 11 (each belonging to one of the jaws 5.1, 5.2) is received in a hole 13 formed through the wall of the body 1 and opening out to both sides of the wall.

The holes 13 extend longitudinally relative to the body 1 and present two side faces 14 that diverge away from each other in the direction in which the pipe end 100 is inserted into the body 1. Each side face 14 co-operates with a stud 11 by sliding thereover like a cam so as to bring the retaining member 5 from a release state in which it releases the pipe end 100 to a grip state in which it grips the pipe end, when the retaining member 5 is moved inside the body 1 from its first position to its second position.

Into each hole 13 there extends a triangular projection having two contiguous sides 15 facing the side faces 14. The sides 15 co-operate with the studs 11 in sliding like cams so as to bring the retaining member 5 from the grip state in which it grips the pipe end 100 to the release state in which it releases the pipe end, when the retaining member 5 is moved in the body 1 from its second position towards its first position.

In the release state, the jaws define a through diameter for the pipe end 100 that is substantially equal to the outside diameter thereof. In the grip state, the teeth 10 bite into the outside surface of the pipe end 100.

When the retaining member is in its second position, the studs 11 co-operate with the hole 13 to define a rear empty space 16, where "rear" is relative to the direction gin which the pipe end 100 is inserted into the body 1, i.e. a space on the side remote from the first position. It is possible to insert the end of a tool such as a screwdriver into the rear empty space 16 in order to push the studs 11 forwards so as to bring the retaining member 5 into its first position. Provision can also be made for at least one of the jaws 5.1 and 5.2 to have an end that projects from the body 1 when the retaining member 5 is in its second position. By pressing on said end, the retaining member 5 can be pushed into its first position in which it allows the pipe end 100 to be released. The two jaws 5.1 and 5.2 may possess respective half-collars in order to make them easier to handle, or only one of the jaws 5.1, 5.2 may present a half-collar (in particular when the two jaws could be held together axially), or it may have a collar pressing against the other jaw.

When the retaining member 5 is in its second position, the studs 11 co-operate with the hole 13 to define a front empty space 17, where "front" is relative to the direction in which the pipe end 100 is inserted into the body 1. The coupling device of the invention has removable abutment means extending into this empty space, in this case a removable ring 18 arranged for clipping onto the body 1 and provided with an inwardly-directed tongue 19 for engaging in the front empty space 17 so as to prevent the studs 11 from moving forwards.

The jaws 5.1 and 5.2 are provided with means for being driven together axially. In this example these means comprise a projection 20 extending from a longitudinal edge of the jaw 5.1 and suitable for being received in a notch 21 formed in the facing longitudinal edge belonging to the jaw 5.2. The projection 20 can slide in the notch 21 in a direction that is tangential relative to the retaining member 5 so as to avoid interfering with the jaws 5.1 and 5.2 moving apart or towards each other.

The body 1 includes angular indexing means for angularly positioning the retaining member 5 relative to the body 1. In this example, these means are formed by the holes 13 co-operating with the studs, however they could equally well comprise an inwardly-directed tongue received between the two jaws 5.1 and 5.2, for example. In which case, it is preferable for the two jaws 5.1 and 5.2 also to have means for preventing the pipe end 100 from turning relative to the jaws. In this example, these means comprise elongate teeth 22 extending axially and projecting inwards into the retaining member 5. This can serve to prevent the pipe end 100 from "unscrewing".

When the pipe end 100 is inserted into the body 1, the pipe end 100 comes into abutment against the retaining member 5, which is then in its grip state, and pushes it back from its second position towards its first position against the force exerted on the retaining member by the sealing element 4. When the retaining member 5 reaches its first position, the sealing element 4 has been pushed back by the retaining member 5 onto the shoulder 6 where it is expanded radially and stretched by the chicanes formed by the setbacks 7 and the tongues 9. The retaining member 5 is itself brought into its release state under the axial penetration force exerted by the pipe. The retaining member then allows the pipe end 100 to pass so that it becomes inserted by force into the sealing element 4 until it comes into abutment against a shoulder situated in the central segment 2. Inserting the pipe into the sealing element is made easier by the sealing element expanding radially on the frustoconical portion of the shoulder 6 and by the sealing element being stretched in the chicanes, these deformations also reducing the cross-section of the sealing element 4. This reduces the need to have recourse to lubrication of the sealing element in order to facilitate insertion of the pipe, where providing lubrication is an operation that is difficult to perform repeatably.

The sealing element 4 tends to return into its state of smaller deformation so it slides on the frustoconical surface of the shoulder 4 and relaxes, pushing the retaining member 5 towards its second position.

While the retaining member 5 is moving from its first position towards its second position, the studs 11 and the side surfaces 14 of the hole 13 co-operate to bring the retaining member 5 from its release state towards its grip state.

The sealing element 4 thus causes the retaining member 5 to begin clamping onto the pipe end such that when a traction force is exerted on the pipe or when the circuit is put under pressure, the pipe reverses and entrains the retaining member into its second position. As a result, the sealing element 4 serves to compensate in part for the operating clearance of the retaining member 5 and to limit the extent to which the pipe end 10 reverses when the fluid transport circuit to which they belong is put under pressure.

In this example, the retaining member 5 is made by injection molding a hard thermoplastic material. In order to facilitate handling and assembly, the jaws 5.1 and 5.2 are connected to each other via a frangible zone 23 (see FIG. 5) which is broken during assembly so as to separate the two jaws from each other.

Naturally, the invention is not limited to the embodiment described and various embodiments can be provided without going beyond the ambit of the invention as defined by the claims.

The side faces 14 and the sides 15 may be curved or rectilinear, mutually parallel, or otherwise.

The cam means may be inverted relative to those described, i.e. there could be a hole in each jaw for receiving a stud projecting into the body.

In order to ensure that the retaining member 5 is returned towards its grip state, the body may include a resilient segment exerting a radial force on the jaws 5.1 and 5.2 urging them towards each other. Inserting the pipe end into the retaining member 5 moves the jaws 5.1 and 5.2 apart by elastically deforming said segment of the body 1. The jaws 5.1 and 5.2 are then clamped onto the pipe end so that a traction force applied thereto will entrain the retaining member 5 towards its second position.

The retaining member may be made of a metal, or of a thermoplastic material, or of a thermosetting material.

Although the body is described as being a single piece, it could be made up from a plurality of pieces.

The invention claimed is:

1. A pipe instantaneous coupling device, comprising:
a tubular body (1); and
means for retaining a pipe end in leaktight manner in the body, said means comprising a retaining member arranged to receive the pipe end, and cam means (11, 14) interposed between the body and the retaining member to bring the retaining member from a release state in which it releases the pipe end to a grip state in which it grips the pipe end when the retaining member is moved axially in the body from a first position to a second position,
wherein the retaining member comprises two independent jaws (5.1, 5.2) mounted in the body to slide between the two above-mentioned positions, and
wherein the cam means comprise two transverse studs (11) secured to the jaws or to the body to co-operate in sliding with side faces (14) secured to the body or the jaws and inclined relative to the sliding direction.

2. A device according to claim 1, wherein each transverse stud (11) projects outwards from one of the jaws (5.1, 5.2), and wherein the side faces (14) belong to the body (1).

3. A device according to claim 2, wherein the side faces (14) are defined in a hole (13) formed transversely through the body (1).

4. A device according to claim 3, wherein the hole (13) opens to the outside of the body (1).

5. A device according to claim 4, wherein, when the jaws (5.1, 5.2) are in the second position, the studs (11) leave a front empty space (17) in the hole beside the first position, and wherein the device includes removable abutment means (18, 19) extending into said empty space.

6. A device according to claim 3, wherein, when the jaws (5.1, 5.2) are in the second position, the studs (11) leave a rear empty space (16) in the hole (13) remote from the first position.

7. A device according to claim 6, including additional cam means (15, 11) interposed between the body (1) and the retaining member to bring the retaining member from the grip state to the release state when the retaining member is placed axially in the body between the second position and the first position, and wherein the additional cam means comprise side faces (15) extending into the front empty space (17).

8. A device according to claim 1, wherein the jaws (5.1, 5.2) include means (20, 21) for securing them axially to each other.

9. A device according to claim 8, wherein the axial securing means comprise complementary axial abutment means (20, 21) secured to each of the jaws, said abutment means being arranged to leave the jaws (5.1, 5.2) free to slide apart from and towards each other.

10. A device according to claim 1, wherein, in the vicinity of the jaws (5.1, 5.2) in their first position, the body (1) includes resilient means (4) for holding the jaws in their grip state.

11. A device according to claim 1, wherein the jaws (5.1, 5.2) are provided internally with teeth (10) for biting into an outside surface of the pipe end.

12. A device according to claim 1, wherein at least one of the jaws (5.1, 5.2), when in its second position, possesses an end that projects from the body.

13. A device according to claim 1, including angular indexing means (11, 14) for indexing the angular position of the retaining member relative to the body (1).

14. A device according to claim 13, including means (22) for preventing the pipe end (100) from turning relative to the retaining member.

15. A device according to claim 1, wherein a first of said two independent jaws is not fixedly attached to a second of said two independent jaws.

16. A pipe instantaneous coupling device comprising:
a tubular body (1) defining a stepped channel having a central segment (2) and an end segment (3) having holes (13) in a wall of the tubular body (1) extending longitudinally with the tubular body (1), each of the holes (13) defined by two divergent side faces (14);
a tubular retaining member in the end segment (3) defining a cylindrical cavity formed of a first jaw (5.1) and a second jaw (5.2) facing the first jaw (5.1) and free of any permanent attachment to the first jaw (5.1), the first jaw (5.1) and the second jaw (5.2) mounted in the end segment (3) and each of the first jaw (5.1) and the second jaw (5.2) having an outside surface and a flared inlet section to facilitate insertion of a pipe end (100) into the retaining member, the first jaw (5.1) and the second jaw (5.2) slidable in a direction parallel to a direction of the insertion of the pipe end (100) between a first position and a second position within the tubular body (1); and a stud (11) extending transversely from the outside surface of each of the first jaw (5.1) and the second jaw (5.2) configured to be received in the holes (13), wherein the side faces (14) cooperate in sliding with the stud (11) of the first jaw (5.1) and the stud (11) of the second jaw (5.2) to bring the retaining member from a release state in which the retaining member releases the pipe end (100) to a grip state in which the retaining member grips the pipe end (100) as the first jaw (5.1) and the second jaw (5.2) of the retaining member moves inside the body (1) from the first position to the second position.

17. A pipe instantaneous coupling device, comprising: a tubular body (1); and a pipe retaining member located within the tubular body, the retaining member comprised of a first pipe retaining element (5.1) and a second pipe retaining element (5.2), the first and second pipe retaining elements being two discrete and separate elements free of any permanent connection therebetween;

cam studs (11) respectively transversely protruding outwardly from each of the first and second pipe retaining elements;

transversal surfaces (14) located on the tubular body and inclined relative to a sliding direction, each cam stud slidingly engaged with a corresponding one of the transversal surfaces to direct the retaining member along the sliding direction axially within the tubular body from a first position to a second position, sliding engagement of the cam studs with the transversal surfaces bringing the body and the retaining member from the first position of a release state in which the retaining member releases a pipe located therein to the second position of a grip state in which the retaining member grips the pipe therein.

* * * * *